April 19, 1960  D. A. BAKER ET AL  2,933,013
MACHINE TOOLS AND THE LIKE

Filed Oct. 8, 1957  6 Sheets-Sheet 1

Fig.1.

INVENTORS
Deryck A. Baker
Cornelius F. Dietrich

By
Watson, Cole, Grindle & Watson
ATTORNEYS

April 19, 1960  D. A. BAKER ET AL  2,933,013
MACHINE TOOLS AND THE LIKE
Filed Oct. 8, 1957  6 Sheets-Sheet 3

INVENTORS
Deryck A. Baker
Cornelius J. Deitrich
By
Watson, Cole, Grindle & Watson
ATTORNEYS April 19, 1960　　　D. A. BAKER ET AL　　　2,933,013
MACHINE TOOLS AND THE LIKE
Filed Oct. 8, 1957　　　　　　　　　　　　　　　6 Sheets-Sheet 6

Fig.6.

INVENTORS
Deryck A. Baker
Cornelius F. Deitrich
By Watson, Cole, Grindle, & Watson
ATTORNEYS

United States Patent Office 2,933,013
Patented Apr. 19, 1960

2,933,013
MACHINE TOOLS AND THE LIKE

Deryck Albert Baker, Peterborough, and Cornelius Frank Dietrich, Maidenhead, England, assignors to The Newall Engineering Company Limited, Peterborough, England, a British company, and Optical Measuring Tools Limited, Maidenhead, England, a British company Application October 8, 1957, Serial No. 688,924

Claims priority, application Great Britain October 8, 1956

6 Claims. (Cl. 88—24)

This invention comprises improvements in or relating to machine tools and the like.

It is an object of the invention to provide means for accurately optically viewing the position of machine tool parts and the parts of like machines having slides or like moving parts. Under the expression "machine tool and like machines" there is herein included not only machine tools but measuring machines, dividing engines and optical comparators, all of which have slides or rotating parts which move and the position of which must be accurately determined.

According to the present invention a machine tool or like machine having a slide or like moving part is provided with means for reading the position of the slide or the like, comprising a measuring scale extending parallel to the direction of movement, an index, and optical means to view the scale and project an enlarged image of the scale divisions, in relation to the index, on to a viewing screen located at a fixed operator-station on the machine.

It is not always convenient on a highly accurate and finely divided scale to place numerals on the scale itself so that they are projected optically on to the screen and moreover if the numerals are placed on the scale itself, the operator in observing the position of the moving part of the machine has always to bear in mind the position of the zero on the scale. Preferably, therefore, in accordance with the present invention in addition to the scale, a numeral-bearing member is provided which is coupled to the scale through a zeroising clamping device, and the optical means projects an image of the numerals on to the screen alongside the image of the scale divisions.

In the preferred construction hereinafter described, an optical micrometer is associated with the optical means to view the scale and serves to subdivide the scale divisions, and means are provided to zeroize the micrometer readings.

It is an important feature of this invention that the complete reading of the indications for any one position of the slide appears in a single screen. The means for the sub-division of the scale divisions, including the scale of the optical micrometer appear beside the scale divisions so that the operator can see at once the precise setting without referring to additional dials. The existence of separated dials is a disadvantage which is quite common on machines of this character.

In the particular machine hereinafter described, which is a jig borer, the table has a compound slide and both movements of the slide are provided with optical means for viewing their position. The invention includes the case of a machine as described above having a slide which carries a second slide, so as to form a compound slide, wherein both slides are provided with measuring scales, indexes and optical means to project images of the scale divisions on to two viewing screens, both said screens being located at the operation-station.

The following is a description by way of example of one construction of machine in accordance with the invention:

The machine to be described comprises a base 11 having at the rear an upstanding column 12 which at its upper end extends forwardly over the base as shown at 13 and carries a drive spindle 14 for a vertically slidable gear box 15. The gear box carries and operates a vertical spindle 16, as is usual in jig boring machines. On the base 11 and beneath the spindle 16 is a guide 17 extending from the column towards the front of the machine and carrying a cross-slide 18 which is movable toward and from the column and extends for a substantial length left and right of the guide on which it works. The left and right-hand ends of the base have upper supporting slides 19 on which the ends of the cross-slide 18 work and beyond which they overhang somewhat. On the cross-slide 18 is a guideway 20 at right angles to the guide 17 on which the cross-slide works and a T-slotted table 21 is movable along the guideway 19. Thus the table 21 has a compound movement on the guideways 17 and 20. All these parts are usual in a jig boring machine.

In front of the base of the machine there is an upstanding console 22, the top of which is somewhat lower than the top of the table 21 and the controls of the machine are concentrated in the console. These include hand wheels 23, 24, one of which (23) actuates a lead screw for the cross-slide 18 and the other (24) of which is geared to mechanism for operating the table 21 along the guideway 20 on the cross-slide. The hand wheels can be disconnected and a power-drive applied for either movement when required, as hereinafter more fully described.

Figure 2:
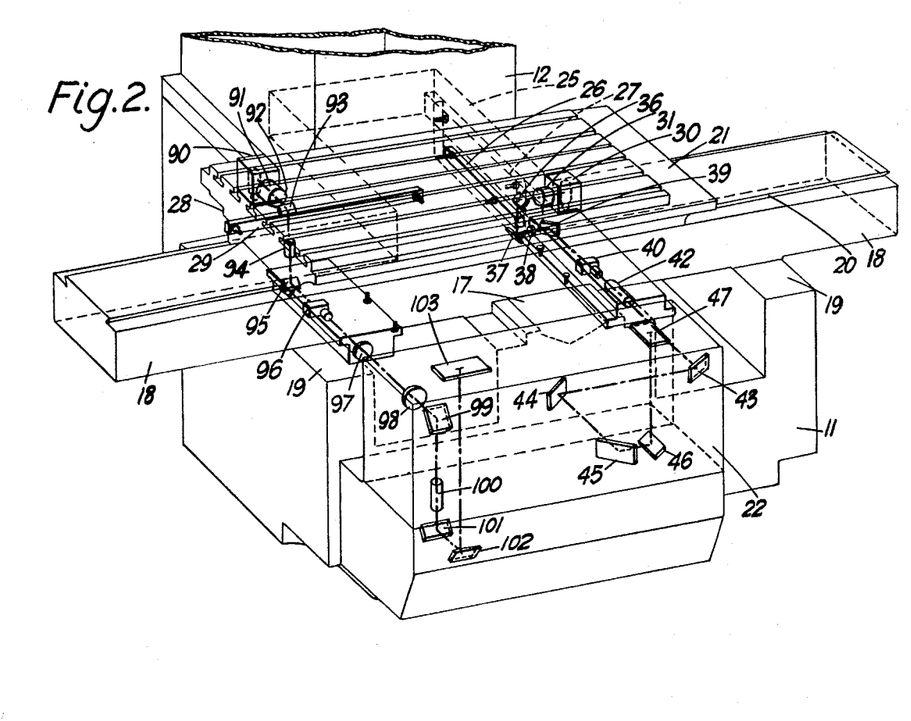
Figure 2 is a diagrammatic perspective showing the arrangement of the optical system in the machine.
Figure 3:
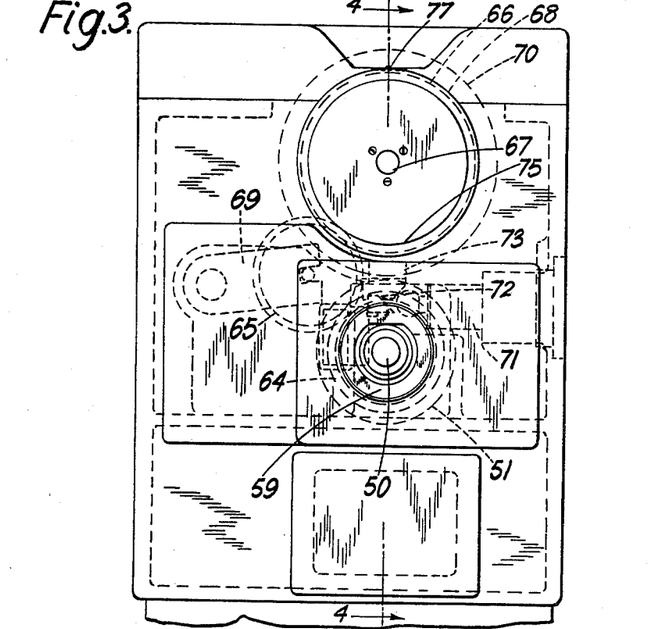
Figure 3 is a right-hand side elevation of the control console.

The cross-slide 18 as viewed in plan is T-shaped, as can be seen in Figure 2, the central leg 25 of the T (shown in dotted lines) extending along the guideway 17 on which the cross-slide works, rearwardly into the column 12. On one side of this T-shaped rearward extension of the cross-slide there is secured an engraved measuring-scale 26. In the diagram the scale and optical parts are shown in full heavy lines and the machine parts, in which they are enclosed, are shown in light lines. As the movements of the cross-slide 18 and table 21 must be effected with great accuracy, the measuring-scale 26 is a highly accurately-engraved element formed on a piece of 58% nickel-iron or other stable material recessed into a carrier 27, and the scale has one division for each twentieth of an inch; that is to say, the scale divisions are fifty thousandths-of-an-inch apart. These divisions are not distinguished by numerals on the scale, a fact which greatly simplifies its engraving. On the back of the table 21 beneath a projecting portion 28 there is a similar scale 29 affixed to indicate longitudinal movement of the table.

Figure 7:
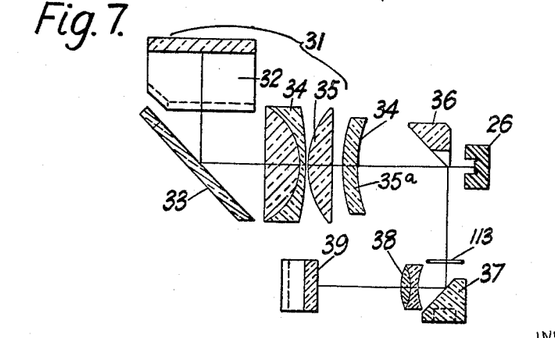
Figure 7 is a detail of the optical system.

The measuring scale 26 on the cross-slide is illuminated by a lamp house 30 and condenser 31 which are fixed to the base 11 of the machine. The lamp house 30 contains a mercury arc lamp and the condenser 31 focusses the image of the arc on to the scale 26. The arc is vertical and therefore its image is somewhat higher than it is long but it is desired to illuminate the scale over an area which is somewhat wider than it is high and therefore a double mirror assembly is introduced between two parts of the condenser 31, in order to turn the image through a right angle, but as the principle of this is well known, it is not shown in the drawing, Figure 2, although it appears in Figure 7. In Figure 7, 32, 33 are mirrors for rotating the image through a right angle and 34, 35 are condenser lenses. The scale 26 is shown in section and it will be observed that the light beam passes from the condenser on to the scale 26 and the image of the scale is picked up by the silvered concave surface 34 (which is indicated by the heavier black line on the upper part of the lens 35a) of the upper half of concave objective lens 35a and reflected on to prism 36. Prism 36 is cut away to allow the condenser 31 to direct light on to the scale. The front (inclined) surface of prism 36 is silvered and is a reflecting mirror. The light reflected by the objective 34 falls upon the silvered face of the mirror 36 and is reflected downwardly on to a further reflector 37 and magnifying lens 38 and thence by a further mirror 39 and another lens 40 (Figure 2) to an optical micrometer 40 which is shown in Figure 9 and is described more fully hereafter; from this instrument the beam passes through projection lens mounting 42 and towards the console 22 and thence by a system of mirrors 43, 44, 45, 46 in the console upwardly on to the underside of a screen 47 carried on the top of the console. The system of mirrors and of the projection generally is such that the lines on the scale 26 are focused on to the screen in a direction parallel to the movement of the cross-slide; that is to say, the movement of the lines as the slide moves will be in a direction toward and from the operator. They are magnified on a scale of fifty to one so that lines one-twentieth of an inch apart on the scale appear 2½" apart on the screen, and the purpose of the optical micrometer 40 is to enable the scale divisions to be accurately subdivided on the screen. Before describing the optical micrometer however it will be convenient to consider the manner in which numerals are projected on to the screen 47 to correspond with the scale divisions.

In the console 22, mounted on an axis extending parallel with the length of the cross-slide, that is, at right angles to the guideway on which it moves, there is a spindle 50 (see Figures 1, 3, 4 and 6) carrying a drum 51. Secured to the underside of the cross-slide is an anchoring point 52 (Figure 6) for a cable 53 and the cable passes within a casing 54 forwardly from the cross-slide beneath a guide pulley 55 to the drum 51, around the drum by one or two turns, back through the casing 54 below the cross-slide, around a pulley 56 at the back and forwardly again to the anchoring point 52 on the table. Adjusting means 57 is provided to tighten the cable, which is of flexible stranded wire, and the central point of the winding of the cable on the drum 51 is secured to the drum by peg 58. To guide the cable 53 it may be wound in a helical groove in the edge of the drum which is not visible in the drawing owing to its small size. Thus the angular position of the drum corresponds with the longitudinal position of the cross-slide 18 on its guide and the size of the drum is such that it makes one complete revolution in the course of the complete traverse of the cross-slide along its guide 17.

Figure 1:
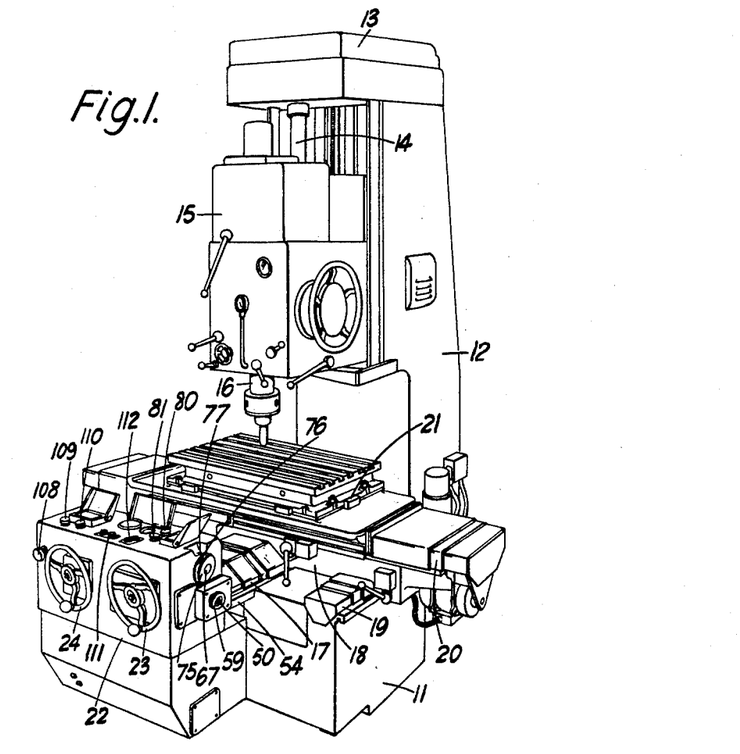
Figure 1 is a perspective view of the machine.
Figures 4, 9:
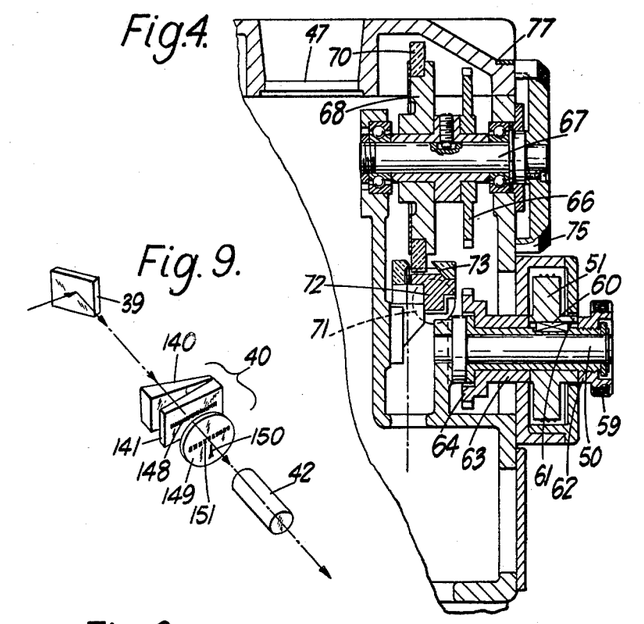
Figure 4 is a section on the line 4—4 of Figure 3 looking in the direction of the arrows.
Figure 9 is a perspective diagram of the same.

The spindle 50 on which the drum is keyed extends out at the righthand side of the console and is screw-threaded to carry a knurled knob 59 (Figures 1, 2 and 4). The key 60 of the drum 51 on the spindle is such that the drum 51 can slide slightly longitudinally and the hub 61 of the drum is engaged by the hub 62 of the screwed knob 59 at one end and by the hub 63 of a gear-wheel 64 within the console on the other (see Figure 4). Tightening the knob 59 will therefore make the drum grip against the gear-wheel and drive it frictionally, while loosening the knob will permit the drum to rotate freely. The gear-wheel 64 on the drum spindle 50 is connected through an idler gear 65 (Figure 3), spring-loaded on a rocker 69 to prevent backlash, with a gear-wheel 66 on a parallel spindle 67 above it which may be described as the optical numeral spindle. The optical numeral spindle 67 carries a mounting 68 for a circular glass scale 70 on which is photographically reproduced a circle of numerals corresponding to the scale divisions of the nickel scale 26 on the cross-slide 18. The cross-slide has a total movement of 18", which is the length of its scale, and the glass circle carries numerals reading from 0 to 18 and corresponding to each scale mark. That is to say, the first numeral is .05, the second numeral .10 and so on through 1.00, 1.05 and so on up to 18. The diameter of the optical numeral scale 70 is about 6", and the numerals photographically reproduced upon it are only one two hundredth of an inch high.

A small optical lantern 71 is mounted below the glass circle 70 and the light from the lantern is collimated by a condenser and reflected by mirrors 72, 73 so as to pass through the circle 70 to an objective and thence by mirrors (not shown) the image of the figures is reflected on to the screen 47 alongside the image of the markings of scale 26. The spindle 67 which carries the circle 70 projects out of the console above the knob 59 which controls the friction drive to the circle 70 and carries a disc 75 with a knurled edge on which is engraved a coarse direct-reading scale 76 rotatable against a reference mark 77 engraved on the top of the console 22 (see Figure 1). This coarse direct-reading scale can be read whilst the cross-slide is in motion and thus enables the operator to stop cross-slide (which is motor driven) at approximately the desired position before having recourse to the fine-setting projection screen 47. By releasing the friction control knob 59 the direct-reading scale 76 can be rotated to any desired position and with it there rotates the optical numeral-carrying circle 70 so that any desired numeral may be set against any scale reading and then locked by tightening the screwed knob 59. This enables any position of the slide to be treated as zero.

Figure 5:
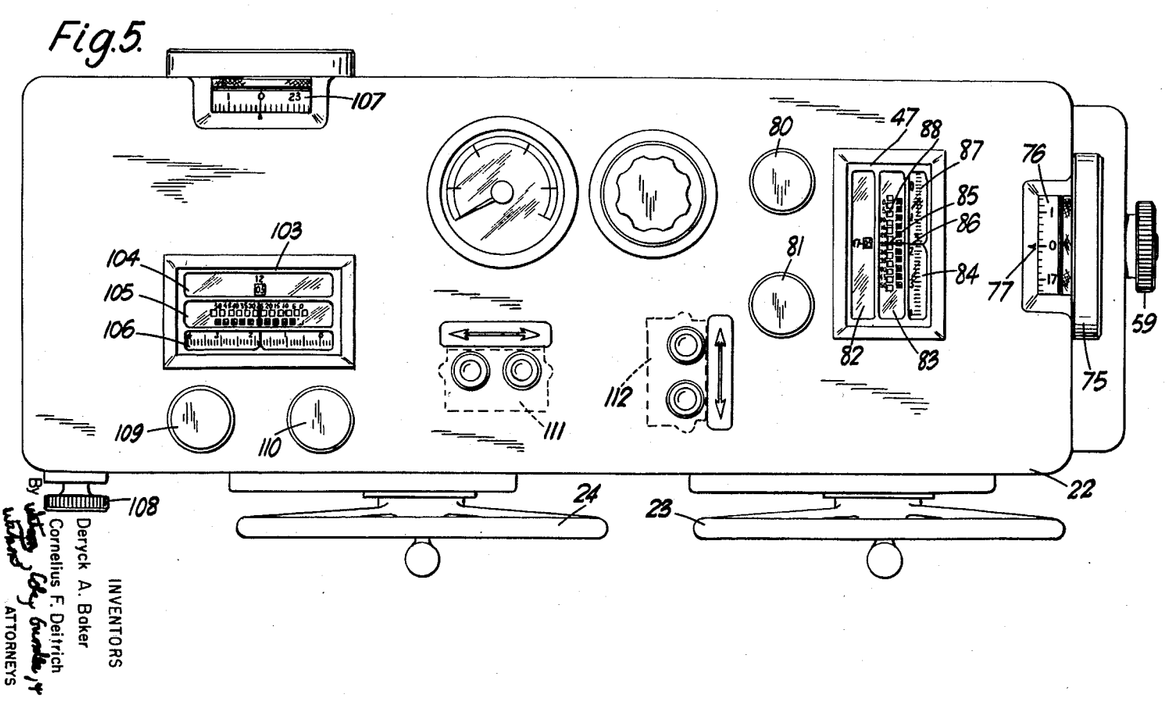
Figure 5 is a plan of the top of the console.
Figure 8:
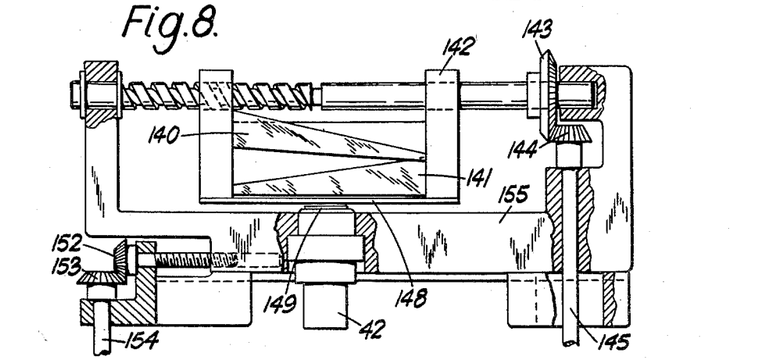
Figure 8 is a diagram in plan of the working parts of the optical micrometer.

Returning to the optical micrometer 40, this consists of two wedge-shaped prisms 140, 141 (Figures 8 and 9) which are opposed in relation to one another and set with a wedge-shaped space between them, as described in Patent No. 2,566,875 so that the light-beam is projected from the scale on the cross-slide towards the screen on the console through the wedge-shaped prisms without angular deviation. Owing to the wedge-shaped space between the prisms, the light beam is however displaced laterally to a small extent and the amount of the displacement will depend upon the setting of the prisms in relation to the light beam. If the beam passes through a wide portion of the wedge-shaped space between the prisms, the light beam will be displaced substantially, but if it has to pass through a narrow portion of the wedge-shaped space it will be displaced very little. The two prisms 140, 141 are mounted on a slide 142 so that they can be adjusted by gears 143, 144 to various positions crossways of the direction of the beam and therefore the amount of the displacement can be varied at will. The prism mounting is mechanically connected by shaft 145 to a fine-scale operating-knob 80 on the console (see Figure 5). The back of the second prism 141 carries a fine scale 148, again as described in the said prior patent.

The back of the micrometer prism 141 is set so as to be at right angles to the light beam and here there is mounted, parallel with the back of the prism and close to the fine scale, a graticule 149 bearing a fiducial mark 150, the latter comprising an index to which the scale on the work supporting slide is referred. The graticule further carries a scale 151 marked out in a series of black blocks, each representing five thousandths of an inch of movement of the scale on the cross-slide 18.

Both the scales, that is the fine scale, the scale of the blocks, and the fiducial mark are projected on to screen 47 alongside the lines of scale 26 and the numbers from the optical circle 70. This can be seen in Figure 5, where the screen 47 is shown divided into the three windows 82, 83, 84. The circle figures appear in lefthand window 82; the scale of blocks appears at 88 in the middle window 83 and the image 87 of the fine scale in the righthand window 84. The image of one of the lines of scale 26 appears at 85; (it will be remembered that these graduations are magnified to be 2½ inches apart as projected on to the screen). The fiducial mark appears at 86. Thus if the cross-slide 18 moves five thousands of an inch toward or from the console, the image 85 which appears on the screen of one of the marks on the cross-slide will be seen to move from the centre of the space between one pair of blocks of the image 88 of scale 151 to the centre of the space between the next pair. The graticule 149 with its fiducial mark 150 and the projection lens 42 are mounted in a cradle 155 which carries the adjustment mechanism for the prisms. The cradle 155 is movable across the light beam in a direction parallel to the direction of movement of the micrometer prisms and is operable through gears 152, 153 and shaft 154 by another knob 81 on the console adjacent to the micrometer knob 80 already referred to. This second knob 81 may be referred to as a zeroising knob. The operation of the fine-scale operating-knob 80 moves the prisms and thus the image 87 of the fine-scale 148 and the operation of the zeroising knob 81 moves the image 86 of the fiducial mark 151 and the image 88 of the graticule. The fine-scale 148 appears on the screen at 87 quite open and is marked from 0 to 5 in thousandths with subdivisions to ten-thousandths.

It will be appreciated that the graticule blocks 151 (which are marked from 0 to .05) serve (when projected with the cross-slide measuring-scale divisions on to the screen) to subdivide the scale divisions 85, which represent lines one-twentieth of an inch (i.e. .050 of an inch) apart. In order to facilitate reading, various means may be provided for distinguishing between measuring-scale marks which represent fractions of a decimal of an inch from 0 to .05 from those which represent fractions from .05 to .10. A preferred way of doing this is to mark the numbers on the optical circle which represent decimals on the cross-slide with their simple dimension, for example 17.0, 17.1, 17.2 and so on and to mark the intermediate numbers with a similar dimension surrounded by a black rectangle as shown in the drawing Figure 5. The graticule blocks are then marked with two series of numerals, namely 0, .01, .02, .03, .04, .05 as one series, placed on the graticule beside the divisions between the blocks, and .05, .06, .07, .08, .09, .10 as a second series which are placed on the other side, and also are surrounded with black rectangles. Then the numbers projected from the circle which are exact decimals are read against the one series of numerals beside the graticule blocks and the intermediate numbers on the circle scale which are distinguished by black rectangles are read against the other series of graticule numerals which have black rectangles around them. Thus if the numeral 17.05 with a black rectangle surrounding it appears in the window 82, with its scale line 85 beside it subdividing the graticule blocks through the space marked by .075 having a rectangle around it the reading is taken as being 17.075. If the scale division which is marked 17.0 and is therefore without a rectangle around it however comes over the graticule blocks at the same point, the reading would be 17.025.

An alternative arrangement would be to mark two series of graticule blocks on the graticule, one reading from 0 to .05 and the other from .05 to .10. The scale on the cross-slide would then be marked with alternate divisions in two different series one which would register with the 0 to .05 graticule blocks and the other which would register with the .05 to .10 blocks. This however complicates the graticule and makes the markings necessarily smaller.

In operating these parts, assuming that the cross-slide is in a particular position which it is desired to treat as zero, the first operation is to turn the fine-scale adjustment knob 80 which moves the optical micrometer prisms so that zero on the fine-scale 87 is set against the image 86 of the fiducial mark. The next operation is to rotate the second knob 81 which moves the image 85 on the screen of the scale lines on the cross-slide 26 relatively to the image of the graticule which carries the fiducial mark and the scale of blocks, so that the zero of the scale of blocks 88 comes against the particular cross-slide scale line 85 which is in view at the moment. After these two operations the knob 59 at the side of the console which operates the friction drive is released and the optical circle 70 is set to bring the image of zero on the circle (in window 82) against the scale-line 85 on the screen. Everything is thus at zero and the knob 59 is tightened again. Any movement of the cross-slide 26 from this position would be exactly measured and can be directly read, the inches and fractions down to one-hundredth by direct reading of the numerals from the optical circle and thousandths on the squares of the scale from the graticule. In order to read to a ten-thousandth, the optical micrometer knob 80 is turned until the scale-line 85 is centred between the nearest two of the squares of the graticule scale 88 and the amount of the adjustment can be read on the fine-scale 87 against the fiducial mark 86. If a further movement of slide 18 is required the fine-scale 87 is first zeroised against the fiducial mark 86 and then any further movement of the cross-slide is effected and is measured by direct reading plus resetting the fine-scale again.

It should be made clear that the lens arrangement is such that movement of the graticule by its zeroising knob 80 appears on the screen to leave the graticule blocks 88 at rest and to move the cross-slide scale markings 85. This keeps the graticule scale 88 at rest and enables a smaller screen to be employed.

Coming now to the indication of movements of the table 21 along the cross-slide 18, the scale 29 on the table is illuminated by a lantern 90 (Figure 2) supported by a bracket not shown on the back of the cross-slide. The optical arrangement of condenser and objective is broadly similar to that for the cross-slide, so that it is unnecessary to show the details. The parts carried on the cross-slide shown in the diagram, Figure 2, include condenser 91, half-silvered concave projection mirror 92, mirror 93 (equivalent to mirror 36 of the cross-slide system), lens 94 (equivalent to 38), mirror 95 and a micrometer unit 96. However, it is necessary to provide for the projection of the beam which projects the table scale from the cross-slide 18 to the console 22 in such a way that the focusing is not affected by the movements of the cross-slide. To this end there is a collimation lens 97 where the beam issues from the cross-slide and this is in line with a second collimation lens 98 on the back of the console. The beam therefore passes from the first collimation lens to the console with the light rays parallel and thence into the second collimation lens 98 which forms an image at unit magnification of the fiducial graticule, the scale lines, and the line scale. Thus any movement of the cross-slide back and forth will produce no movement of the image formed by the second collimation lens.

Any change in angular disposition of the two collimation lenses 97, 98 would however cause a movement of this latter image, but no error would be introduced since the image would move as a whole, and there would be no relative movement between the scale lens and the fiducial graticule. Such movement of the complete image would however, if it occurred, be very small since it could only occur through errors in the slideways of the machine.

The light beam is now reflected by mirror 99 on the console through a projection lens 100 on to further mirrors 101, 102 which direct it on a screen 103 in the top of the console similar to the screen 47 already described. The screen 103 has three windows 104, 105, 106 (Figure 5) of which in one (104) there appears an image from a glass numeral circle, in another (105) there appears the image of the squares on the fiducial graticule together with an image of the scale lines, and in the third (106) there appears the image of the fine scale carried by one prism of the optical micrometer. The optical circle is operated by a flexible cable which moves a drum on the cross-slide in a similar way to the cable 53 operating drum 51 of Figure 6. The drum on the cross-slide is connected to the second optical circle in the console by a backlash-free splined-shaft which telescopes and so transmits rotation while permitting movements of the cross-slide 18. There is a rough setting scale 107 at the back of the console and a friction-clutch screwed-knob 108 on the front of the console, which operate similarly to the like parts 59 and 76 on the cross-slide mechanism. There is also a zeroising knob 109 connected to the optical micrometer by a splined-shaft to allow for the cross-slide movement and there is another splined-shaft for moving the micrometer parts and the graticule transversely to the light beam which is operated by a fine-adjustment knob 110 on the console. The method of taking the readings of the table is the same as before described in connection with the readings of the cross-slide position. In addition to the hand wheels 23, 24 for operating the table and the cross-slide, there are two press-button controls 111 and 112 on the console for starting, stopping and reversing power movements of the table and the cross-slide. Thus the operator, without moving his position, can read in the screens on the console the exact position of the cross-slide and the table to one ten-thousandths of an inch and he can operate the cross-slide and the table to move them to any desired position, either by the hand wheels or by power through the push-button controls. The result is that the speed of setting of the table to a given position is increased, but in addition to this, owing to the simplicity of the zeroising movements which are provided for both scales, the operator is saved the risk of mistakes which arise when it is desired to move the table through an accurate distance from one position to another, in order to space out a pair of holes which are to be machined, and time is saved in the setting operations for the same reasons.

Figure 6:
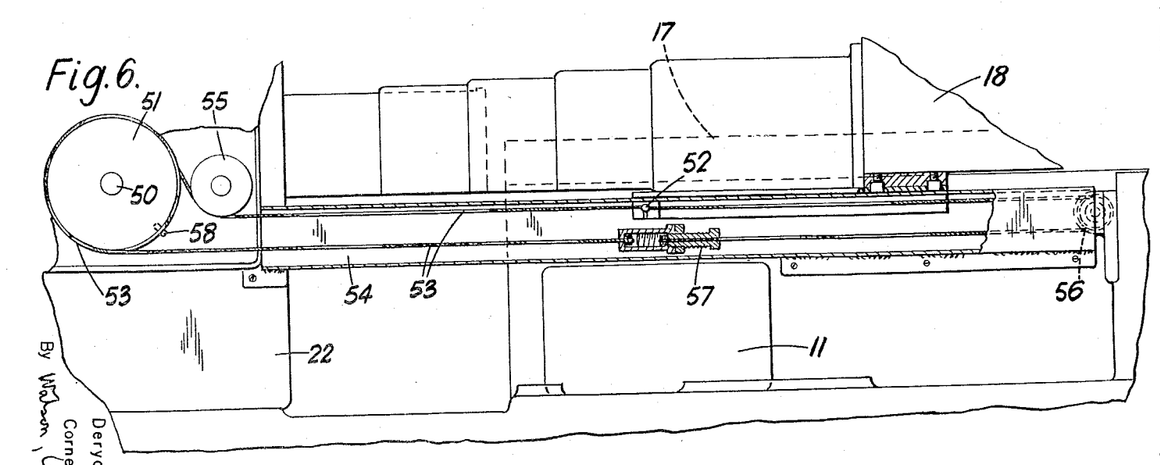
Figure 6 is a side elevation of the principal parts of a mechanical connection from the cross-slide to the console.

Instead of cable-and-drum devices such as are shown in Figure 6 for operating the transparent figure-circles, rack and pinion or other like devices could be employed. Furthermore, instead of the optical micrometer being manually adjusted by knobs on the console it may be adjusted by say electrical remote control means.

Referring to Figure 7 a glass block 113 is rotatably mounted to be movable by a lever coupled to a bar (not shown) carried by the cross-slide 18 to form a scale compensating device. If the scale 26 is in error i.e. too short or too long then as the cross-slide 18 moves the lever running on the bar rotates the glass block and thereby effectively shortens or lengthens the scale as the case may be.

We claim:
1. In a machine tool comprising a supporting structure having a movable work carrying member thereon, apparatus for indicating the position of the member with relation to said supporting structure; said apparatus comprising, in combination, two mutually referable elements as a basis for indicating purposes, said elements consisting of a graduated scale extending parallel to the direction of movement of said member, and an index mark; one of said elements being mounted to move with said work carrying member and the other carried separately by a portion of said supporting structure; a screen on a fixed portion of said supporting structure, an optical system for projecting an image of the index mark and the scale in relation to one another onto the screen, a numeral-bearing member, operative connections connecting the numeral-bearing member to that one of said elements which moves with the work carrying member so that it may move proportionately to the movement thereof, clutch means for connecting and disconnecting said operative connections, another optical system for projecting an image of numerals from the numeral-bearing member onto the screen in correlation to the image of said index mark and scale, and means for moving the numeral-bearing member to set the numerals in relation to the scale when the clutch means is declutched.

2. In a machine tool comprising a supporting structure having a rectilinearly movable work carrying member thereon, apparatus for indicating the position of the member with relation to said supporting structure; said apparatus comprising, in combination, two mutually referable elements as a basis for indicating purposes, said elements consisting of a graduated scale comprising extremely fine markings without numeral designations and extending parallel to the direction of movement of said member, and an index mark; said scale being mounted to move with said work carrying member and the index mark carried separately by a portion of said supporting structure; a screen on a fixed portion of said supporting structure, an optical system for projecting an image of the index mark and the scale in relation to one another onto the screen, a numeral-bearing member, operative connections connecting the numeral-bearing member to that one of said elements which moves with the work carrying member so that it may move proportionately to the movement thereof, clutch means for connecting and disconnecting said operative connections, another independent optical system for projecting an image of numerals from the numeral-bearing member onto the screen in correlation to the image of said index mark and scale, and means for moving the numeral-bearing member to set the numerals in relation to the scale when the clutch means is declutched; said index mark being a fiducial marking on a graticule disposed in the path of the light beam which carries the image of the scale in said first named optical system, and means for adjusting the graticule transversely to the light beam to initially set the index mark in relation to the scale.

3. A machine tool, apparatus as claimed in claim 2, wherein the graticule carries also a scale marked to subdivide the divisions of the measuring scale.

4. The indicating apparatus for a machine tool, as set forth in claim 2, in which the two optical systems are so constructed and arranged to project the images of the index mark and scale and the image of the numerals onto the same screen for ready direct reading of integers and fractions of dimensions on the scale.

5. The indicating apparatus for a machine tool, as set forth in claim 2, in which an optical micrometer is incorporated in said first named optical system to view the said scale and serves to subdivide the scale divisions, and means are provided to zeroize the micrometer readings, and wherein the optical micrometer is of the type in which the light beam carrying the main scale divisions is displaced to a variable extent by reversed prisms movable transversely to the light beam, and the micrometer carries a micrometer scale to indicate such displacement which is located in the path of the light beam which carries the image of the scale divisions and is projected therewith beside said image onto the same screen as the image of the scale divisions.

6. The indicating apparatus for a machine tool, as set forth in claim 1, in which the supporting structure comprises a fixed console portion and a sliding portion mounted thereon, and in which said work carrying member is slidably mounted on said sliding portion of the structure, said first named optical system comprising parts carried by said sliding portion of the supporting structure and parts including the screen carried by said fixed console portion, and a relay collimation system is disposed in the line of said first named optical system between the parts carried by said sliding portion and said fixed portion of the structure to properly convey the images across the gap between the two portions of the structure without affecting the accuracy of the readings, said relay collimation system including a collimation lens carried by said sliding portion and also a second collimation lens carried by said stationary console, these lenses being movable with respect to each other upon relative movement of the portions of the supporting structure.

References Cited in the file of this patent

UNITED STATES PATENTS

| | | |
|---|---|---|
| 2,480,237 | Godfrey et al. | Aug. 30, 1949 |
| 2,566,875 | Dietrich et al. | Sept. 4, 1951 |
| 2,728,248 | De Vlieg | Dec. 27, 1955 |
| 2,809,540 | Schultze | Oct. 15, 1957 |

FOREIGN PATENTS

| | | |
|---|---|---|
| 283,138 | Switzerland | Sept. 16, 1952 |
| 638,607 | Great Britain | June 14, 1950 |